(12) United States Patent
Swenson et al.

(10) Patent No.: US 9,331,944 B2
(45) Date of Patent: *May 3, 2016

(54) REAL-TIME NETWORK MONITORING AND SUBSCRIBER IDENTIFICATION WITH AN ON-DEMAND APPLIANCE

(71) Applicant: Opera Software Ireland Limited, Dublin (IE)

(72) Inventors: Erik R. Swenson, San Jose, CA (US); Nitin Bhandari, Fremont, CA (US)

(73) Assignee: Opera Software Ireland Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,032

(22) Filed: May 23, 2014

(65) Prior Publication Data

US 2014/0254380 A1 Sep. 11, 2014

Related U.S. Application Data

(63) Continuation of application No. 13/907,847, filed on May 31, 2013, now Pat. No. 8,792,347.

(60) Provisional application No. 61/654,689, filed on Jun. 1, 2012, provisional application No. 61/745,391, filed on Dec. 21, 2012.

(51) Int. Cl.
*H04L 12/28* (2006.01)
*H04L 12/801* (2013.01)
(Continued)

(52) U.S. Cl.
CPC .............. *H04L 47/11* (2013.01); *H04L 43/04* (2013.01); *H04L 43/0882* (2013.01);
(Continued)

(58) Field of Classification Search
USPC ........... 370/232–252, 328–343; 709/224–230
See application file for complete search history.

(56) References Cited

U.S. PATENT DOCUMENTS 6,147,970 A * 11/2000 Troxel .......................... 370/235
6,529,515 B1 3/2003 Raz et al.
(Continued)

FOREIGN PATENT DOCUMENTS

CN 1674532 A 9/2005
EP 1944922 A1 7/2008
(Continued)

OTHER PUBLICATIONS

PCT International Search Report and Written Opinion, PCT Application No. PCT/US13/43873, Aug. 2, 2013, 13 pages.
(Continued)

*Primary Examiner* — Man Phan
(74) *Attorney, Agent, or Firm* — Fenwick & West LLP

(57) ABSTRACT

A system and a method are disclosed for selectively monitoring traffic in a service provider network. The system receives a notice for a beginning of a network data flow, which responds to a request from a user device for content at an origin server. The system then determines whether to monitor the data flow from the origin server to the user device. If so determined, the system collects statistic information of the data flow and stores the statistic information to a flow record in a database. The system also maps the flow record to a subscriber of the service provider network by analyzing the statistic information of the data flow and estimates bandwidth provided to the data flow by the service provider's network based on the analysis of the statistic information of the data flow.

27 Claims, 8 Drawing Sheets

(51) Int. Cl.
*H04L 12/26* (2006.01)
*H04W 24/00* (2009.01)
*H04W 24/08* (2009.01)
*H04W 28/06* (2009.01)
*H04W 24/10* (2009.01)

(52) U.S. Cl.
CPC .............. *H04L 47/12* (2013.01); *H04W 24/00* (2013.01); *H04W 24/08* (2013.01); *H04W 28/06* (2013.01); *H04W 24/10* (2013.01)

(56) References Cited

U.S. PATENT DOCUMENTS

| | | | |
|---|---|---|---|
| 6,643,259 B1 * | 11/2003 | Borella et al. | 370/231 |
| 6,694,310 B1 * | 2/2004 | Yu et al. | 707/718 |
| 7,257,640 B1 | 8/2007 | Callocchia et al. | |
| 7,412,517 B2 * | 8/2008 | Jorgensen | 709/226 |
| 7,920,594 B2 | 4/2011 | Carlson et al. | |
| 7,957,417 B2 | 6/2011 | McKinnon, III et al. | |
| 7,970,011 B2 | 6/2011 | Carlson et al. | |
| 7,983,272 B2 | 7/2011 | Carlson et al. | |
| 7,986,669 B1 * | 7/2011 | Oh | 370/331 |
| 8,073,968 B1 | 12/2011 | Shah et al. | |
| 8,364,812 B2 * | 1/2013 | Loach | 709/224 |
| 8,451,733 B2 * | 5/2013 | Chao | 370/235 |
| 2002/0172222 A1 | 11/2002 | Ullmann et al. | |
| 2005/0267928 A1 | 12/2005 | Anderson et al. | |
| 2008/0262991 A1 | 10/2008 | Kapoor et al. | |
| 2008/0273591 A1 | 11/2008 | Brooks et al. | |
| 2009/0086651 A1 | 4/2009 | Luft et al. | |
| 2010/0017439 A1 | 1/2010 | Chen et al. | |
| 2011/0161836 A1 | 6/2011 | Mu et al. | |
| 2011/0242994 A1 | 10/2011 | Carvalho et al. | |
| 2011/0280216 A1 | 11/2011 | Li et al. | |
| 2012/0026871 A1 | 2/2012 | Hu et al. | |
| 2012/0233311 A1 | 9/2012 | Parker et al. | |
| 2013/0086279 A1 * | 4/2013 | Archer et al. | 709/233 |
| 2013/0128735 A1 * | 5/2013 | Li et al. | 370/230 |
| 2013/0223219 A1 * | 8/2013 | Mir et al. | 370/232 |

FOREIGN PATENT DOCUMENTS

| | | |
|---|---|---|
| KR | 10-2007-0076933 A | 8/2007 |
| WO | WO 2011/047335 A1 | 4/2011 |

OTHER PUBLICATIONS

U.S. Appl. No. 61/334,548, filed May 13, 2010, Inventors S. Li et al.
United States Office Action, U.S. Appl. No. 13/907,847, Sep. 16, 2013, 12 pages.
Korean Office Action, Korean Application No. 10-2014-7036908, Aug. 28, 2015, 6 pages (with concise explanation of relevance).
Chinese First Office Action, Chinese Application No. 201380038766.2, Dec. 3, 2015, 7 pages (with concise explanation of relevance).
European Extended Search Report, European Application No. 13797712.0, Feb. 1, 2016, 11 pages.

* cited by examiner

REAL-TIME NETWORK MONITORING AND SUBSCRIBER IDENTIFICATION WITH AN ON-DEMAND APPLIANCE

CROSS REFERENCE TO RELATED APPLICATIONS

This application is a continuation of U.S. application Ser. No. 13/907,847, filed May 31, 2013, now U.S. Pat. No. 8,792, 347, which claims the benefit of, and priority to, U.S. Provisional Application No. 61/654,689 filed on Jun. 1, 2012 and U.S. Provisional Application No. 61/745,391 filed on Dec. 21, 2012, all of which are incorporated by reference in their entirety.

BACKGROUND

1. Field of Art

The disclosure generally relates to improving user experience on a network, and more specifically, to monitoring bandwidth consumption of the many devices connected to a given node in the network.

2. Description of the Related Art

Mobile devices, such as smart phones and tablets, have become prevalent in recent years. Given the fast advance in mobile computing power and far-reaching wireless Internet access, more and more users view streamed videos on their mobile devices. The detection of network congestion has become increasingly important for network operators attempting to maximize user experience on the network. Even as network operators are ever increasing the capacity of their networks, the demand for bandwidth is growing at an even faster pace. Managing network growth and dealing with congestion in the infrastructure is particularly important in the mobile space because of the high cost of radio spectrum and radio access network (RAN) equipment utilized by wireless mobile networks. These high costs prevent mobile service providers from engineering excess capacity into each network access point through the purchase of additional RAN infrastructure. The same situation can, however, also happens to other types of network infrastructure.

Existing network elements can give operators a view into the current state of traffic in their network, but they do not provide a measure of "goodness," i.e., how much elasticity is left or how much more data can the network handle. This measure is important for multimedia content delivery since a good user experience usually depends on the network's ability to deliver data in a reliable and sustainable fashion. A minimum data rate is required to prevent stalling and re-buffering during the streaming of multimedia content, hence ensuring sufficient bandwidth is important to quality of experience. Typically, multimedia content providers are sufficiently equipped to deliver multimedia content at levels far beyond the capabilities of wireless infrastructure. Hence, the burden falls on wireless service providers to implement network data optimization to ease the traffic burden and maximize the experience of each and every user on the network. Currently, however, mobile service providers are often forced to use very coarse tools that have little visibility into which network segments are congested and tend to apply optimization to flows that may not need any optimization.

Typically, mobile service providers use inline network appliances that monitor every bit of subscriber traffic in order to make estimates of network throughput. This puts a huge burden on the system since it must scale to handle hundreds of thousands to millions of network requests per second through a single network access point. Furthermore, network service providers often must utilize these monitoring techniques on a micro-scale (e.g., per RAN equipment installation) in order to react to the condition of the network, which results in increased cost. In addition, a large portion of web traffic consists of small object requests, which can obscure network monitoring at any level due to their short lifetime and bursty characteristics.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
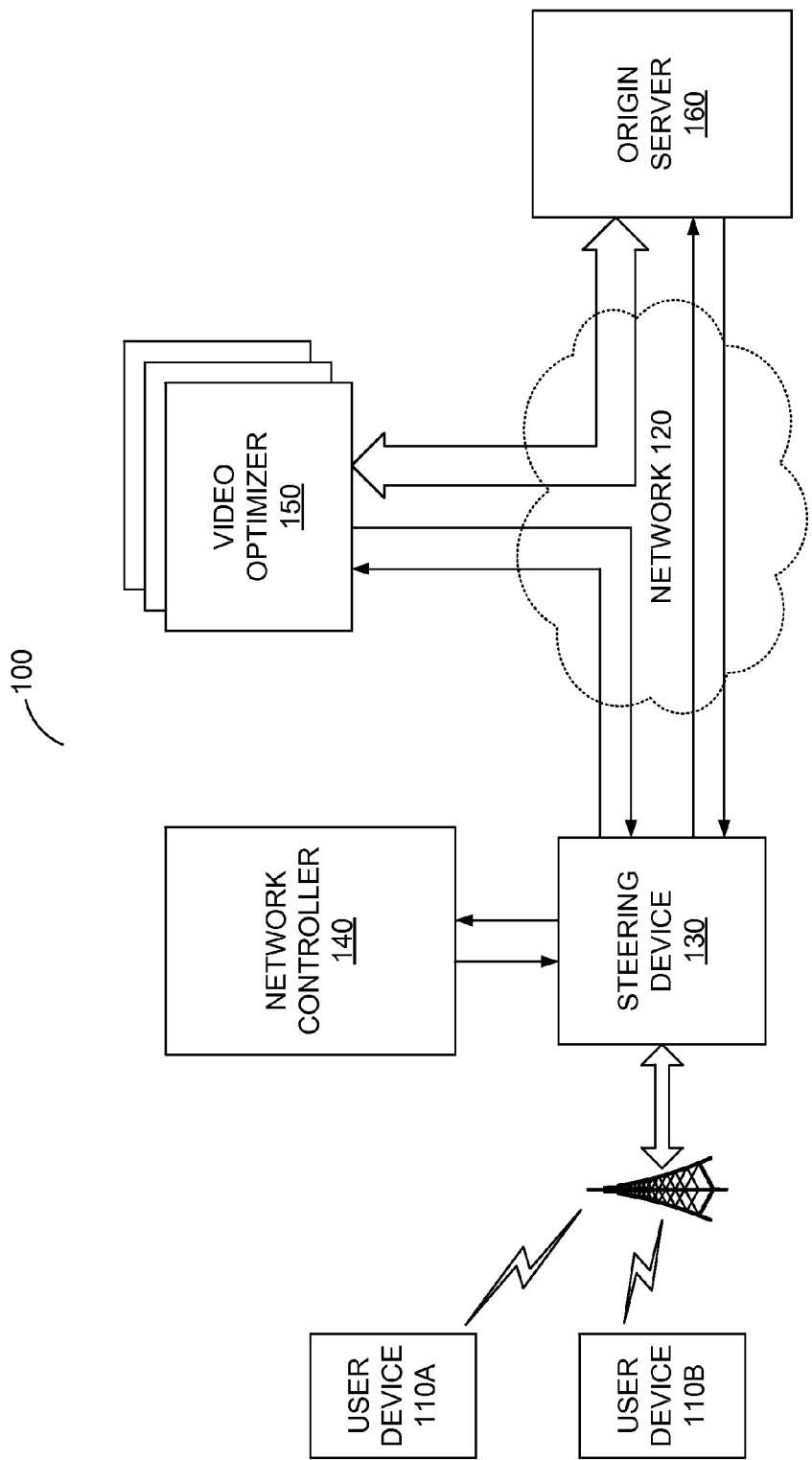
FIG. 1 illustrates a high-level block diagram of an example communications environment for selective on-demand real-time network monitoring and subscriber identification.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

Embodiments disclosed include a network controller system for real-time data gathering on the state of existing network traffic flows and mapping flow data to respective users in the network to predict available bandwidth and level of congestion. By gathering a history of flow statistics in the network, the network controller system establishes a relationship between base stations (or other network segments) and their capability to deliver the amount of data typically required by a particular user of the network. The very recent history of network flows can be used to predict the near future congestions in a substantially real-time fashion. Furthermore, the history of flow statistics can be used to build a long-term map of user behavior on the network, which can more effectively predict on demand data delivery requirements for the collection of users utilizing a given network access point in a consistent manner. The network controller keeps a flow state database, which groups flow data in a number of ways, such as on per station/cell tower, per subscriber, per time-of-day, or per geography area basis. As new flows are presented to the system for inspection, database can be queried to estimate the network congestion level for new flows to determine whether existing, new or future flows require optimizations in order to maintain the desired level of user satisfaction.

In one embodiment, an on-demand network monitoring method is adopted to gather data about network flows as they traverse the network. For example, network flows can be monitored selectively or on-demand based on the types of the content carried in the flows. Furthermore, the network monitoring can also be performed selectively at inline level, as well as out-of-band to improve efficiency. Both TCP and UDP flows are monitored to gather information about the state of the network, such as the average network throughput for each flow and end-to-end latency between, for example, a client device and an origin server providing multimedia content to the client device. For each TCP or UDP flow, the system tracks the number of bytes sent (and in some embodiments acknowledged). In TCP, the current window size may also be tracked. Records on network flows are stored in a flow statistics database, which can be indexed by subscriber identification (ID), cell tower (base station), and network segment etc. As many flow records accumulate, this database represents both historical and current network condition and capacity for delivering data. Network throughput can be measured by calculating an average number of bytes delivered over a period of time. Steps may be taken to filter out spurious data from small flows with size less than a certain threshold that, when measured, cause very noisy results in measuring bandwidth and/or latency. For example, any flow having delivery time of less than 500 ms can be filtered.

In another embodiment, large objects, such as video files and data, traversing the network are monitored and paced. Rather than just measuring the bandwidth associated with large object delivery, estimates for future bandwidth needs of the network are determined based on the measurements. In turn, large objects may be selectively optimized to preserve network throughput. For video objects, streaming bit rate of the flow provides a parameter, which can be compared against network capacity to determine if the network is able to sustain the required level of throughput. It is often advantageous to pace the transfer speed to not exceeding a known cap. If a flow can be delivered at a rate between the minimum level needed to keep the video from stalling and the upper limit of the pacing limit, then the network segment on which the flow traverses is said to be capable of sustain the bit rate required for the flow. Large objects like video and images take a period of time to be delivered, which aids in measuring the origin server latency and detecting network congestion more accurately than small flows. For example, a reasonable size threshold for separating a large object from a small object can be set between 512 kB to 1 MB, and 50 kB and up for medium-sized objects. Other values are also possible.

In some embodiments, the bandwidth attained by a single flow may be sufficient to determine the capacity of the network segment(s) the flow traverses. Therefore, with a fairly small deployment of network controller(s), an accurate detection of key network congestion points can be derived. Specifically, one does not need to monitor every flow going through a network segment to detect congestions. Since video currently comprises around 50% of the traffic on a network but only around 5% of total flows, a relatively small number of flow samples of large objects can map a statistically significant portion of the network.

The unpredictable and transient nature of network congestion means that mitigation of the network congestion will be too late if not acted upon in near real-time after congestion is detected. In one embodiment, the network controller selects large video or image flows through an on-demand video optimizer to optimize large object delivery and thus available network bandwidth. With the controller and/or optimizer to intelligently and selectively handle the measurement and optimization, these operations are offloaded from network routing appliances.

Real-Time Traffic Monitoring

FIG. 1 illustrates a high-level block diagram of an example communications environment 100 for selective on-demand real-time network monitoring and subscriber identification. The environment 100 comprises user devices 110, an origin server 160, a steering device 130, a network controller 140, a video optimizer 150, and a network 120. The network 120 is a communication network that transmits data between the user devices 110, the steering device 130 and the origin server 160 and/or the video optimizer 150. In one embodiment the network 120 includes wireless network and the Internet.

A network efficiency strategy that aspires to keep capital expenditure from outpacing revenues has to be balanced with demands from consumers for better user experiences that rely increasingly on higher data usage. Today, mobile operators are employing a variety of tools to manage capacity including data usage caps, Wi-Fi offload and intelligent optimization. The environment 100 demonstrates such a solution that provides a unified foundation with deep session intelligence, integrated services management, and dynamic adaptability to fit any service offering. Together, the network controller 140 and the video optimizer 150 deliver a world-class media optimization solution that brings a surgical capacity advantage to wireless operators as well as Internet service providers with better peak capacity savings than alternative solutions.

In one embodiment, the user devices 110 are computing devices with network capabilities. Oftentimes, for example, the user devices 110 are wireless enabled mobile computing device with a web browser and media display capability. The user devices 110 as mobile computing devices may include laptops, netbooks, tablets, smart telephones, or personal digital assistants (PDAs). While only two user devices 110A and 110B are illustrated in FIG. 1, the environment 100 may include thousands or millions of such devices. The web browsers may be software applications running on mobile devices 110 for retrieving web content from the origin server 160 and presenting the web content on a display coupled to the mobile device. Web content accessed by the user devices 110 include text, images, audio and video content. The multimedia content can be played back by the browsers, for example, HTML5 compatible browsers, plug-in or a standalone media player. The browsers can also invoke the media players or plug-ins available on the user devices 110 and passes images, audio and/or video to the media player or plug-in for playback.

The steering device 130 may be a load balancer or a router located between the user device 110 and the network 120. The steering device 130 provides the user device 110 with access to the network and thus, provides the gateway through which the user device traffic flows onto the network and vice versa. In one embodiment, the steering device 130 categorizes traffic routed through it to identify flows of interest for further inspection at the network controller 140. Alternatively, the network controller 140 interfaces with the steering device 130 to coordinate the monitoring and categorization of network traffic, such as identifying large and small objects in HTTP traffic flows. In this case, the steering device 130 receives instructions from the network controller 140 based on the desired criteria for categorizing flows of interest for further inspection.

However, information on the wireless/cellular user devices 110 side is often not available at the steering device 130 that sits between the cellular network and the wired Internet. For example, there is often no information about the identifiers of the towers associated with the mobile devices 110. Tower association information only broadcasted when the mobile devices first attached to the network. In addition, user devices 110 do not usually report any identification information except their IP addresses. Therefore, monitoring of the network traffic and detection of the congestion is automated and managed by the detector 140 so that network can be optimized for end user's experience without the mobile user's knowledge.

In contrast to conventional inline TCP throughput monitoring devices that monitor every single data packets transmitted and received, the network controller 140 is an "out-of-band" computer server that interfaces with the steering device 130 to selectively inspect user flows of interest. The network controller 140 may further identify user flows (e.g., among the flows of interest) for optimization. In one embodiment, the network controller 140 may be implemented at the steering device 130 to monitor traffic. In other embodiments, the network controller 140 is coupled to and communicates with the steering device 130 for traffic monitoring and optimization. When queried by the steering device 130, the network controller 140 determines if a given network flow should be ignored, monitored further or optimized. Optimization of a flow is often decided at the beginning of the flow because it is rarely possible to switch to optimized content mid-stream once non-optimized content delivery has begun. However, the network controller 140 may determine that existing flows associated with a particular subscriber or other entity should be optimized. In turn, new flows (e.g., resulting from seek requests in media, new media requests, resume after pause, etc.) determined to be associated with the entity may be optimized. The network controller 140 uses the network state as well as historical traffic data in its decision for monitoring and optimization. Knowledge on the current network state, such as congestion, deems critical when it comes to data optimization.

As a flow is sent to the network controller 140 for inspection, historical network traffic data stored at the network controller 140 may be searched. The historical network traffic data includes information such as subscriber information, the cell towers to which the user devices attached, routers through which the traffic is passing, geography regions, the backhaul segments, and time-of-day of the flows. For example, in a mobile network, the cell tower to which a user device is attached can be most useful, since it is the location where most congestion occurs due to limited bandwidth and high cost of the radio access network infrastructure. The network controller 140 looks into the historical traffic data for the average of the bandwidth per user at the particular cell tower. The network controller 140 can then estimate the amount of bandwidth or degree of congestion for the new flow based on the historical record.

The video optimizer 150 is a computer server that provides video and image optimization and delivers optimized video and image content to the user devices 110 via the network 120. The video and image optimization is an on-demand service provided through the transcoding of the video and image content. For example, when a user device attempts to retrieve video from the origin server 160, the network controller 140 may decide that the flow meets certain criteria for content optimization. The network controller 140 then redirected the user devices 110 to the video optimizer 150 to retrieve the optimized content. The video optimizer 150 receives information in the redirect request from the user devices 110 or from the network controller 140 about the video or image content to be optimized and retrieve the video or image content from the corresponding origin server 160 for optimization and subsequent delivery to the user devices 110.

The disclosed embodiments focus on the video optimization because video is of far greater importance than all other traffic types when network congestion is considered. Video traffic makes up around half of all network traffic—and the percentage is growing every year. Therefore, optimizing video traffic massively reduces congestion in the network. Video flows or streams are also long lived, having large packet size, and demanding high bitrates, monitoring video streams is an effective ways of detecting congestion in the network. Furthermore, because video streams require steady and consistent bandwidth, they are among first to be impacted when congestion occurs and available network bandwidth reduces. By contrast, web page text and images are generally not affected under mild network congestion with unnoticeable longer load times. Video optimization differs in one key aspect to optimizing other web content: it is long form, and the optimization policy decisions made at the beginning of a video have significant impact on the ability to deliver a consistent experience for the length of the video.

The video optimizer 150 and the origin server 160 are typically formed of one or more computers. While only one server of each video optimizer 150 and origin server 160 is shown in the environment 100 of FIG. 1, different embodiments may include multiple web servers and video servers operated by a single entity or multiple entities. In other embodiments, a single server may also provide different functionalities, such as delivering web content as a web server, as well as serving optimized video content.

Computing Machine Architecture

Figure 2:
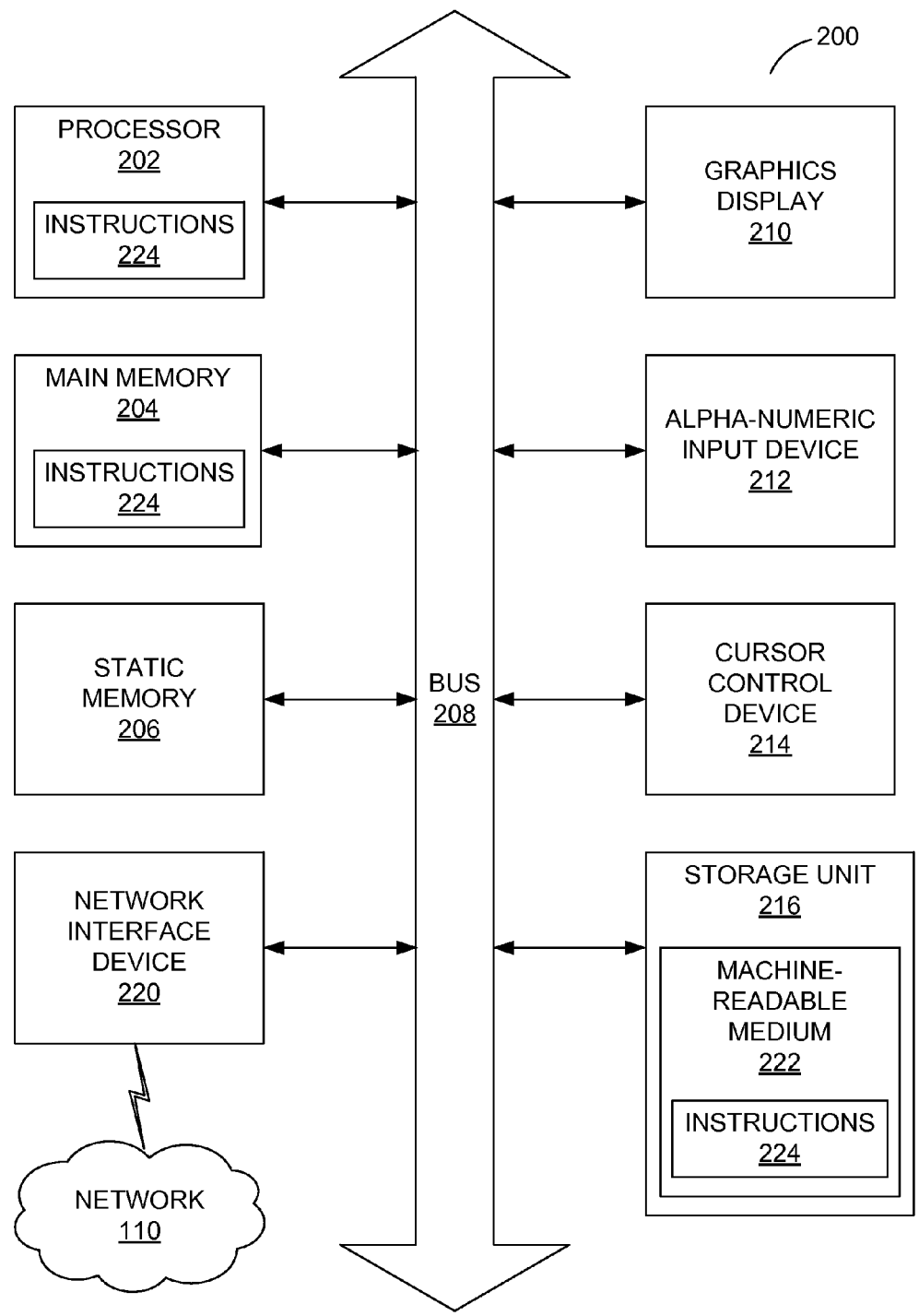
FIG. 2 illustrates one embodiment of components of an example machine able to read instructions from a machine-readable medium and execute them in a processor (or controller).

FIG. 2 is a block diagram illustrating components of an example machine able to read instructions from a machine-readable medium and execute them in a processor (or controller) to implement the disclosed system for on-demand real-time network monitoring and subscriber identification. Specifically, FIG. 2 shows a diagrammatic representation of a machine in the example form of a computer system 200 within which instructions 224 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smart phone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes one or more processors 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

System Components of Network Controller

Turning back to FIG. 1, the network controller 140 allows network operators to apply fine granular optimization policies to ensure high quality of experience (QoE) based on cell tower congestion, device types, subscriber profiles and service plans with lower hardware and software costs. The architecture of the network controller 140 provides an excellent fit for the net neutrality guideline of "reasonable network management", and better compliance to the copyright law (DMCA) than solutions that rely on long-term caching. Having the ability of monitoring network traffic on a per subscriber, per flow, or per video file basis, the network controller 140 also selectively monitors and optimizes only a subset of traffic that benefits from optimization the most, thus achieving both scalability and efficiency for optimization at a competitive price-point. The core element of the network controller 140 lies in its mechanisms for congestion detection and mitigation, which allows optimization resources to be utilized in the most efficient and surgical manner.

Figure 3:
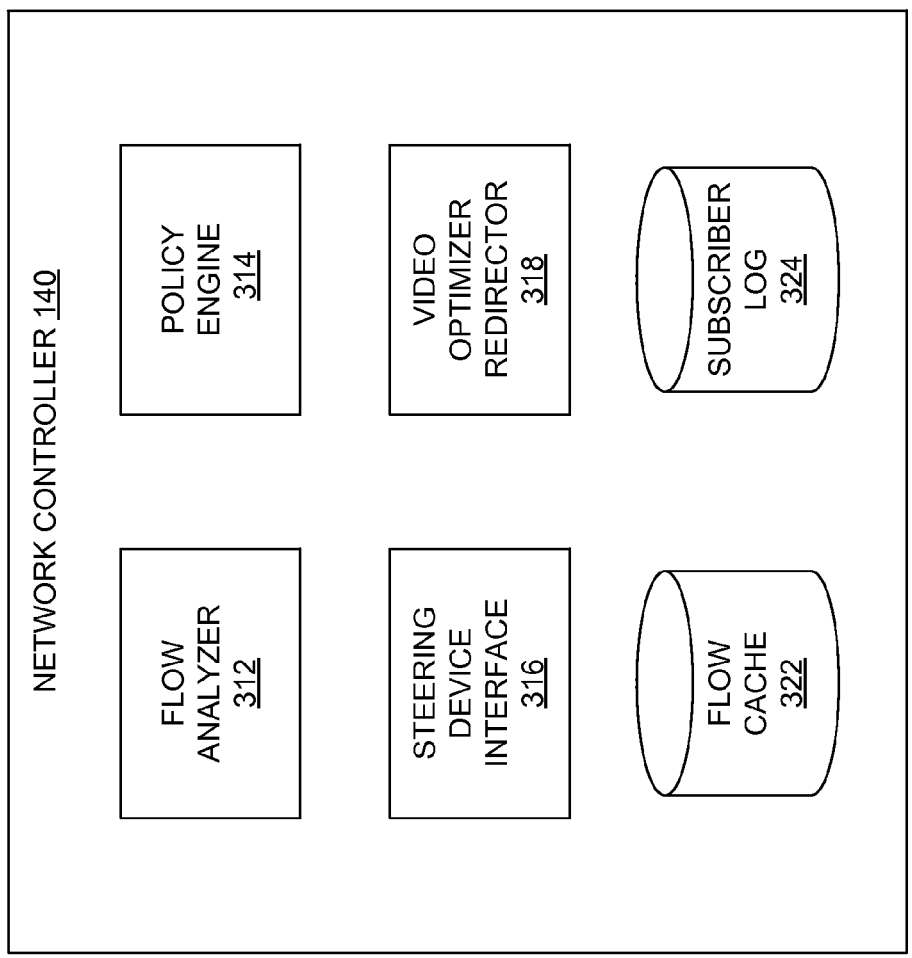
FIG. 3 illustrates one embodiment of an example architecture of a network controller for providing selective real-time network monitoring and subscriber identification.

Referring now to FIG. 3, it illustrates one embodiment of an example architecture of the network controller 140 for providing selective real-time network monitoring and subscriber identification. The network controller 140 comprises a flow analyzer 312, a policy engine 314, a steering device interface 316, a video optimizer redirector 318, a flow cache 322, and a subscriber log 324. In other embodiments, the network controller 140 may include additional, fewer, or different components for various applications. Conventional components such as network interfaces, security functions, failover servers, management and network operations consoles, and the like are not shown so as to not obscure the details of the system architecture.

The flow analyzer 312 monitors large flows in the network, analyzes collected flow statistics to determine network throughput, and accordingly selects flows to be optimized. The flow analyzer 312 does not need to see all the flows in order to make an accurate estimate of network conditions. The flow analyzer 312 processes the traffic statistics stored in the flow cache 322 and user information stored in the subscriber log 324, for example, by associating network flows identified by source IP addresses to a mobile subscriber or user, which is identified by his or her current subscriber ID or device ID. The user flows are also mapped to a congestion level at the current sub-network (e.g., a cell with which the user devices are associated), so that an optimization decision can be made at the beginning of the data transmission.

Conventionally, congestion detection for mobile networks focuses on extracting network status actively from the radio access network (RAN) via dedicated hardware probes. For example, a probe for each sub-section of the network (e.g., a mobile cell) periodically (e.g., every 2 minutes) collects and transmits the network statistics, such as congested cell sites, level of congestion (e.g., none, low, medium, high), and active subscribers currently associated with the cell, to one or more network monitoring servers. However, dedicated hardware solutions are costly and network statistics collected by these hardware probes may not available to third-party entities due to privacy policies.

The network controller 140 collects real-time statistical data on the network flows from core network side without probes deployed in the RAN network. The statistical data is stored and compared against historical flow data to estimate level of congestion and available network bandwidth. Instead of collecting traffic statistics for every flow and every session, the network controller 140 samples only large flows involving media objects such as videos and images above a certain size (e.g., above 50 kB). The network controller 140 can choose to be a pass-through device to monitor the large flows as well as to determine whether to optimize the flows. Measuring only larger flows has the advantage to mitigate corruptions caused by origin server latency and network glitches. Furthermore, focusing on the large flows helps the network controller to reduce the background noise and to increase noise-to-signal ratio in bandwidth measuring by removing the impact of millions of tiny or small flows with delivery time in milliseconds. Therefore the reliability of bandwidth estimation and congestion detection is much higher.

Based on the statistical data collected, the flow analyzer 312 determines near real-time network condition by taking into consideration all the information accumulated, such as over the last few minutes. The most powerful application of this analysis comes from the near real-time estimation of bandwidth consumption on a per user basis, which allows the flow analyzer 312 to generate a data footprint or behavior pattern of a particular user. For example, it is possible to detect a situation where a user is experiencing difficult network conditions while attached to a non-congested tower, if the user is at the edge of the cell or behind walls in a building causing poor connectivity.

Additionally, historical flow data over a longer term helps the flow analyzer 312 to determine repeating patterns and heat-maps of certain network sections and to predict when they are under congestion. In this case, the flow statistics stored in the flow cache 322 can be mapped against traffic categories for analysis, for example, long-term running averages of video flow bandwidth help determine suitability for optimization. Furthermore, estimated bandwidth per user (or per cell-ID, per tower, or per router) over time may be metrics calculated by the flow analyzer 312 in order to determine short term needs for optimization. For example, the flow analyzer 312 may determine to being optimizing flows associated with a particular cell-ID (or those flows for identified high-bandwidth users on the cell-ID) in response to a threshold number of high-bandwidth users connecting to a same cell tower corresponding to the cell-ID. The reason why flow analyzer 312 selectively monitors large flows lies in the realization that TCP statistics for small objects, which make up most web flows, can be misleading and cause huge errors in throughput estimations.

The steering device interface 316 interacts with an external routing appliance, such as the steering device 130 to divert portions of the network traffic (e.g., large object network flows). Existing routing appliances in most carrier networks are designed to handle large amounts of network traffic. They are not, however, ideal devices to operate for monitoring and analysis individual flows. Through the steering device interface 316, the network controller 140 may communicate with the external routing appliances, such as the steering device 130, to steer a portion of network traffic to the network controller 140 when certain conditions are met. Generally, network flows of interest to the network controller 140 contain larger media objects, such as videos and images. In one embodiment, the smaller flows, such as web page and text information, are not exchanged over the steering device interface 316.

The flow cache 322 stores monitored flow information, which is updated for a flow with each associated transaction from the steering device 130. In one embodiment, data in the flow cache is stored in a map indexed by a hash, which can be up to 64-bit or longer. An entry in the flow cache map may be organized as a linked list to allow hash collisions. Alternatively, fewer bits in the hash index can also be used to speed up binary search in the flow cache map. For example, instead of using 64-bit hash index, which requires at worst 64 steps to find a node, the hash index can be reduced to 16-24 bits. There will be more hash collisions, hence the longer linked list. Other embodiments may use other type of maps or binary trees instead of the linked list to further optimize the hash collision searches.

The subscriber log 324 stores user or subscriber information, such as user or subscriber identifications and their device information. In one embodiment, the subscriber and device information is provided to the subscriber log 324 by the administrators or operators of the carrier or service provider networks. In other embodiments, the subscriber or the device information of the carrier networks (e.g., mobile ISPs) is not available to the network controller 140. This makes bandwidth measurement more difficult since multiple users' devices may share a single IP address using the network address translation (NAT) protocol. Accordingly, algorithms that separate multiple users sharing an IP address can be implemented by the flow analyzer 312 to determine the amount of bandwidth available to individual users.

The data stored in the flow cache 322 and the subscriber log 324 is used for bandwidth monitoring and user identification by the flow analyzer 312. The flow analyzer 312 scans through all the entries in the flow cache map. Since other operations, such as an addition of a new flow cache entry or an update to flow statistics, may compete with the scanning and cause data corruption, the flow analyzer 312 locks the flow cache while performing user identification and bandwidth monitoring. To keep the locking minimum, the scanning can be suspended after a pre-determined number of operations. The flow analyzer 312 can resume where it left off on the next pass. This is achieved by keeping, for example, an iterator of the last map position scanned. In case another operation causes changes to the iterator, the iterator can be adjusted accordingly to make sure it is always valid.

The policy engine 314 defines policies for optimizing large flows with media objects to mitigate network congestion. Detecting and acting on congestion in the network, the design focus of the network controller 140 is built on this very flexible policy engine. The policy engine 314 is capable of taking virtually any input, either deduced from HTTP headers and payload (e.g., through RADIUS/Gx interface), or provided by the network infrastructure via API, and making decisions on how to apply optimization based on individual or a combination of these inputs. The optimization policies can be applied to large flows all the time or on a time-of-day basis, a per user basis, and/or depending on the network condition.

For example, the policy engine 314 can be configured to apply optimization based on time-of-day for different segments of the network. The time-of day configuration may be determined based on historical flow statistic data stored in the flow cache 322 using the knowledge of patterns in network condition and bandwidth consumption of certain network segments during specific time-of-day or week. For instance, if network-wide "high congestion" occurs from 7 pm to 10 pm every day, a policy can be set to optimize video during the time period with a source video bit rate over 225 kbps. If network-wide "medium congestion" occurs from 3 pm to 7 pm every day, to optimize video with a source bit rate over 300 kbps. It is also possible to manually overwrite the time-of-day policy at any time when the congestion happens.

It is possible for the policy engine 314 to adjust optimization policies not only based on network congestion, but also based on overall optimization capacity. Depending on the optimization capacity installed to serve the network, optimization requests may be "oversubscribed" at the optimization servers. As a means of monitoring the optimization capacity, "health check" messages are exchanged between the network controller 140 and video optimizer 150 server pools. If an optimizer pool is fully utilized, the network controller 140 will be notified. As the optimizer pool approaches full utilization, the policy engine 314 can dynamically adjust bit rate threshold of the flows to be optimized to accommodate only the largest flows.

For example, assume that network is under congestion, and the targeted mobile bit rate for a flow is at least 225 kbps. Typically, the policy engine 314 optimizes any video flow with bit rate of 15% or higher than the targeted rate (i.e., about 260 kbps). But once the optimization capacity of the video optimizer 150 reached 85%, the policy engine 314 increases the threshold so that only videos with a bit rate of 300 kbps and above are optimized to maximize the overall bandwidth savings. As the video optimizer 150 reaches even higher utilization, the threshold level will be further increased, for instance, only HD videos will be optimized, since the greatest user experience benefit comes from the "heaviest" videos.

Full geo-redundancy and geo-load sharing are also supported at the policy engine 314. For example, if local pool of optimizers is fully utilized, the optimization request can be passed to a remote optimizer pool. In effect, the policy engine 314 allows the current network condition as well as the available capacity to determine the type or size of video flows to be optimized. This opens up the possibility to acquire optimization resources that fit a budget and keep the optimization servers at full utilization all the time, knowing that the network controller automatically prioritizes the video to achieve best efficiency.

Note that the decision to optimize a video is most often made before the streaming begins because optimizing a video mid-stream faces significant technical challenges. Once a video starts to be streamed to the device, certain parameters are no longer addressable via optimization. For example, video resolution (width×height) cannot be changed mid-stream, thus a significant technique for optimization is not possible. As another example, during the streaming, video frame rate can only be changed by dropping frames, without being able to re-encode the video in a different frame rate. Thus intra-frame information is affected and video quality is significantly affected. Furthermore, it is technically impossible to achieve mid-stream adaptation for the dominant video streaming format, such as MP4 format used for the majority of iOS and Android applications. MP4 file format requires that all optimization decisions made before the first byte is sent. Therefore, the network controller 140 always determines the level of optimization at the beginning of each video stream. The optimization target can be configured as a combination of resolution, frame-rate and bandwidth to ensure that subscribers get a consistent user experience from beginning to end.

The video optimizer redirector 318 generates a redirect request to a URL pointing to the video optimizer 150 if the video is deemed to be transcoded. In one embodiment, the URL may contain at least one of a video resolution, a video bit rate, a video frame rate divisor, an audio sample rate and number of channels, an audio bit rate, a source URL, a user agent of a client, a source domain cookie and any other authentication data by the video optimizer 150. The video optimizer redirector 318 rewrites the original response with the HTTP redirect and sets the location header to the new URL. This causes the user devices 110 to issue a new request to the video optimizer 150. The video optimizer redirector 318 also has the logic to look for incoming URLs generated by itself so that they are not intercepted again.

Network Monitoring and Congestion Detection

Figure 4A:
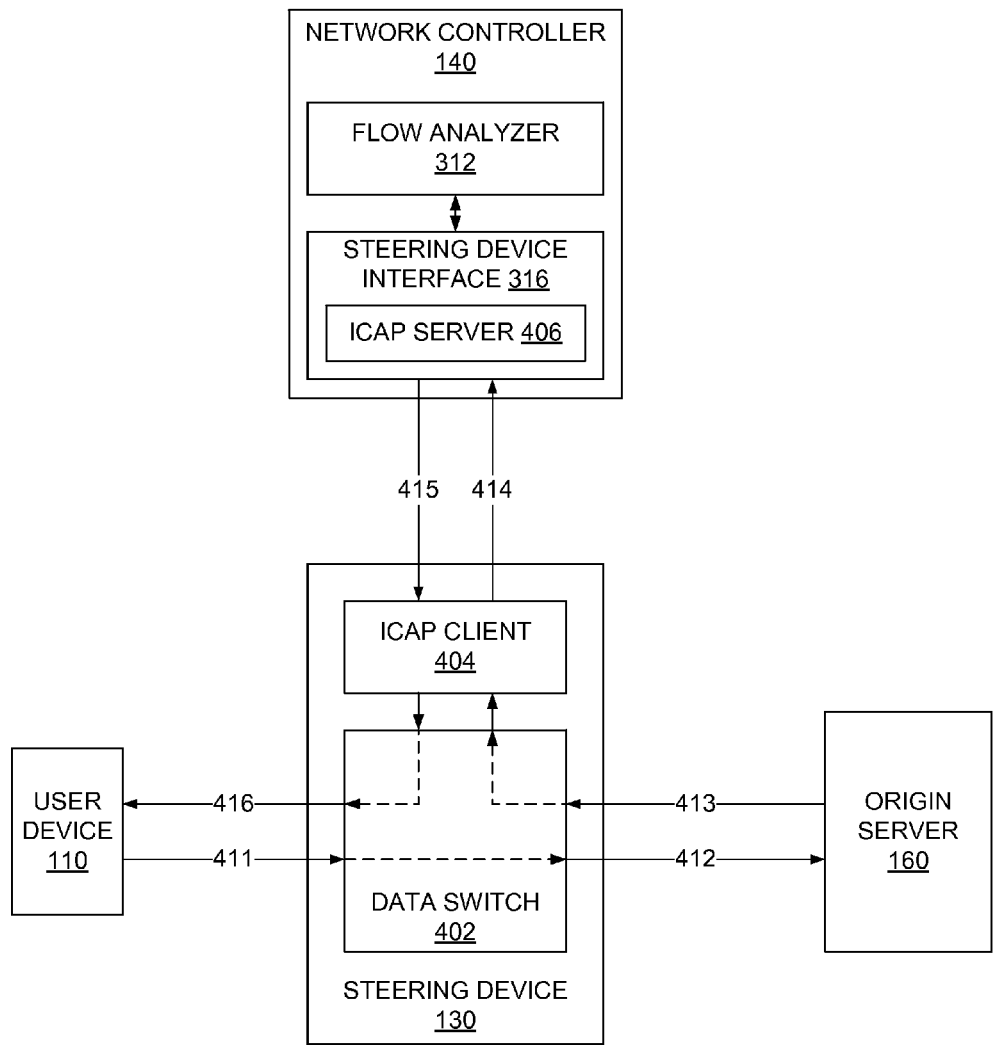
FIGS. 4A-4B illustrate embodiments of example working modes of the network controller for providing selective on-demand network monitoring and subscriber identification.
Figure 4B:
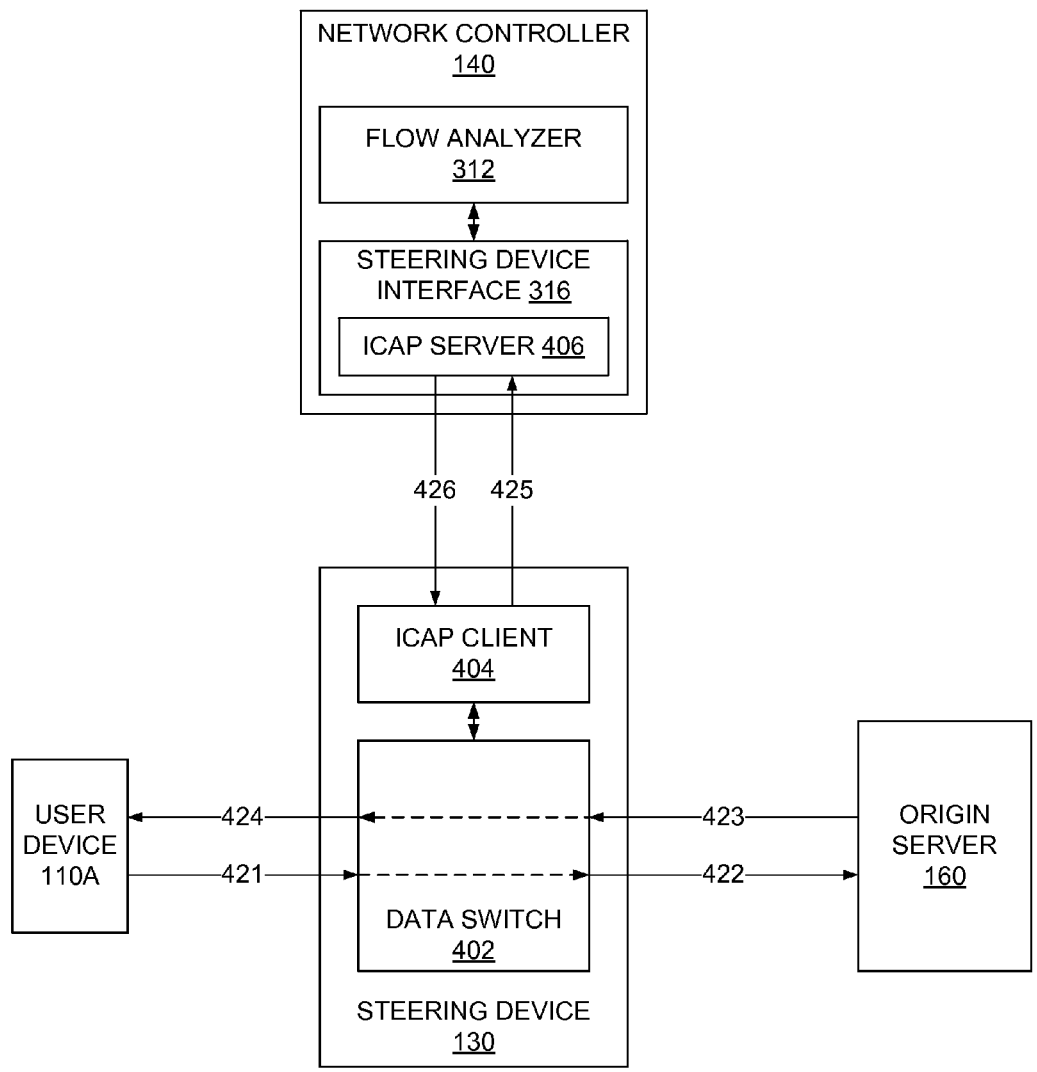

FIGS. 4A and 4B each illustrates one embodiment of an example working mode of the network controller for providing selective on-demand real-time network monitoring and subscriber identification. Shown with the network controller 140 are the user device 110, the steering device 130, and the origin server 160. The network controller 140 is coupled to the steering device 130 through the steering device interface 316. In one embodiment, the network controller 140 and the steering device 130 communicate with each other using the Internet content adaption protocol (ICAP). The steering device interface 316 executes an ICAP server 406, which interacts with an ICAP client 404 running on the steering device 130. Similar or different protocols may be used for communication between the network controller 140 and the steering device 130 in other embodiments.

The Internet content adaption protocol is a lightweight protocol aimed at executing a simple remote procedure call on HTTP messages. ICAP leverages edge-based devices to help deliver value-added services using transparent HTTP proxy caches. Content adaptation refers to performing the particular value added service, such as content manipulation or other processing, for the associated HTTP client request/response. ICAP clients pass HTTP messages to ICAP servers for transformation or other processing. In turn, the ICAP server executes its transformation service on the HTTP messages and sends back responses to the ICAP client. At the core of this process is a cache that can proxy all client transactions and process them through ICAP servers, which may focus on specific functions, such as ad insertion, virus scanning, content translation, language translation, or content filtering. ICAP servers, such as those utilized by the network controller 140, handle these tasks to off-load value-added services from network devices including an ICAP client, such as the steering device 130. By offloading value added services from the steering device 130, processing infrastructure (e.g., optimization services and network controllers) may be scaled independent from the steering devices handling raw HTTP throughput.

Referring now to FIG. 4A, network traffic flows from the user device 110 through the steering device 130 and arrive at the origin server 160 over the network request path. For example, a browser on the user device 110 may request web content from the origin server 160. A HTTP request message initiated at the user device 110 is forwarded to the steering device 130 over the network link 411. A data switch 402 inside the steering device 130 then relays the request message to the origin server 160 over the network link 412. On the opposite direction, network traffic originated from the origin server 160 flows through the steering device 130 back to the user device 110 over the network response path. For example, the origin server 160 responds to the user request by sending web content over the network link 413 to the steering device 130, which forwards the web content to the user device 110 over the network link 416. Note that the network links 411 and 416 are two opposite directions on the same physical link, so are the network link pair 414 and 415. On the other hand, the network link pair 412 and 413 may or may not share the same network path because traffic between the steering device 130 and origin server 160 on opposite directions may be routed differently over one or more routers.

In one embodiment, as the steering device 130 monitors network responses, it is looking for flows that match one or more signatures for video and images. When a matching flow is detected, the steering device 130 forwards the HTTP request and a portion of the HTTP response to the network controller 140 over the ICAP client interface 404. After receiving the request and the portion of response at the ICAP server interface 406, the flow analyzer 312 of the network controller 140 performs a deep flow inspection to determine if the flow is worth bandwidth monitoring and/or user detection. For example, the flow inspection performed by the flow analyzer 312 may determine if the flow indeed contains large or medium object (e.g., larger than 50 kB), and/or if the source IP address of the flow is from a user or a group of users that are required to be monitored by policies. The flow analyzer 312 may also determine if the flow needs to be optimized based on historical flow statistical data.

If the flow is deemed of interest, the steering device 130 is notified to steer the flow through the network controller 140. This is known as the "continue" working mode for bandwidth monitoring. In the "continue" mode, the network controller 140 interfaces with the steering device 130 to function, on-demand, as a traditional inline network element for flows deemed of interest. Thus, the network controller 140 ingests the network flow for inspection and subsequently forwards the network flow on the network response path. For example, for this particular flow, the origin server 160 responds to the user request by sending video or images over the network link 413 to the steering device 130, which forwards the video or images to the network controller 140 over a network link 414. After the network controller 140 updates the flow statistics, the video or images are returned to the steering device 130 over a network link 415, which transmits the video or images to the user device 110 over the network link 416.

Once a flow is reported to the network controller 140, a flow cache entry is created for the flow in the flow cache 322. The flow cache entry keeps track of the flow and its associated bandwidth. For a flow that is marked in "continue" mode, each time the steering device 130 forwards a next portion of the flow payload to the network controller 140, the flow cache 322 updates the number of bytes for transmitted in the flow. By monitoring the number of bytes per flow over time, the flow analyzer 312 is capable of determining an estimate value of bandwidth associated with flow. Furthermore, since the steering device 130 does not have infinite packet buffers, if congestion happens on the network link 416 from the steering device 130 to the user device 110, the TCP congestion control mechanism kicks in at the steering device 130, which may slows down and/or eventually stop receiving data over the network link 413 from origin server 160. During the congestion, the steering device 130 would not forward any data to the network controller 140, since the link 416 is congested and the network controller 140 would not be able to transmit data to the user device 110. Therefore, as an inline element, the network controller 140 can detect network congestions and estimate bandwidth associated with any flows of interest selected by the network controller 140. However, in the "continue" mode, the network controller 140 does not modify and transform the HTTP messaged it receives over the ICAP interface. The network controller 140 simply updates the flow statistics and returns the video or images to the steering device 130 for transmission to the user device 110.

Based on the flow statistics stored in the flow cache 322, the network controller 140 can also aggregate the flows associated with a user or subscriber in order to estimate the total available bandwidth occupied by the user or subscriber. In one embodiment, the network controller 140 tracks all the flow cache entries looking for flows originated from a common source IP address or a user device identifier. The flow analyzer 312 of the network controller 140 then attempts to group these flows together to form a flow history for the user or subscriber. The network controller further identifies users or subscribers using two data components in the flow cache entry: the TCP source port and HTTP cookies associated with the flow. Together with the flow history, the network controller 140 establish pattern, and identify users or subscribers and stores subscriber information in the subscriber log 324. More details of the flow cache and user mapping are described below with reference to FIG. 7.

FIG. 4B illustrates one embodiment of a second example working mode of the network controller 140 for providing selective on-demand network monitoring. In FIG. 4B, the network request path consists of a network link 421 from the user device 110 to the steering device 130, and a network link 422 from the steering device 130 to the origin server 160. On the opposite direction, the network response path consists of a network link 423 from the origin server 160 to the steering device 130, and a network link 424 from the steering device 130 back to the user device 110. Note that the network link pair 421 and 424 share the same physical link, so are network link pair 425 and 426.

Similar to the "continue" mode, after receiving the initial HTTP messages of a flow and determining to monitor the flow, the network controller 140 notify the steering device 130 to work in a "counting" mode for bandwidth monitoring. In contrast to the "continue" mode, when a matching flow is detected for "counting" mode, the steering device 130 forwards the HTTP response directly to the user device 110. While at the same time, the steering device 130 send a customized ICAP message to the network controller 140 over the network link 425. In one embodiment, the customized ICAP message contains the HTTP request and response headers, as well as a count of payload size of the current flow. After updating the flow statistics, the network controller 140 may acknowledge the gateway over the network line 426. In the "counting" mode, the network controller 140 does not join the network response path as an inline network element, but simply listens to the counting of flow size. The benefit of the "counting" mode is to off-load the network controller 140 from ingesting and forwarding the network flow on the network response path, while still enabling the detection of congestions and estimation of bandwidth associated with the flows of interest.

Figure 5:
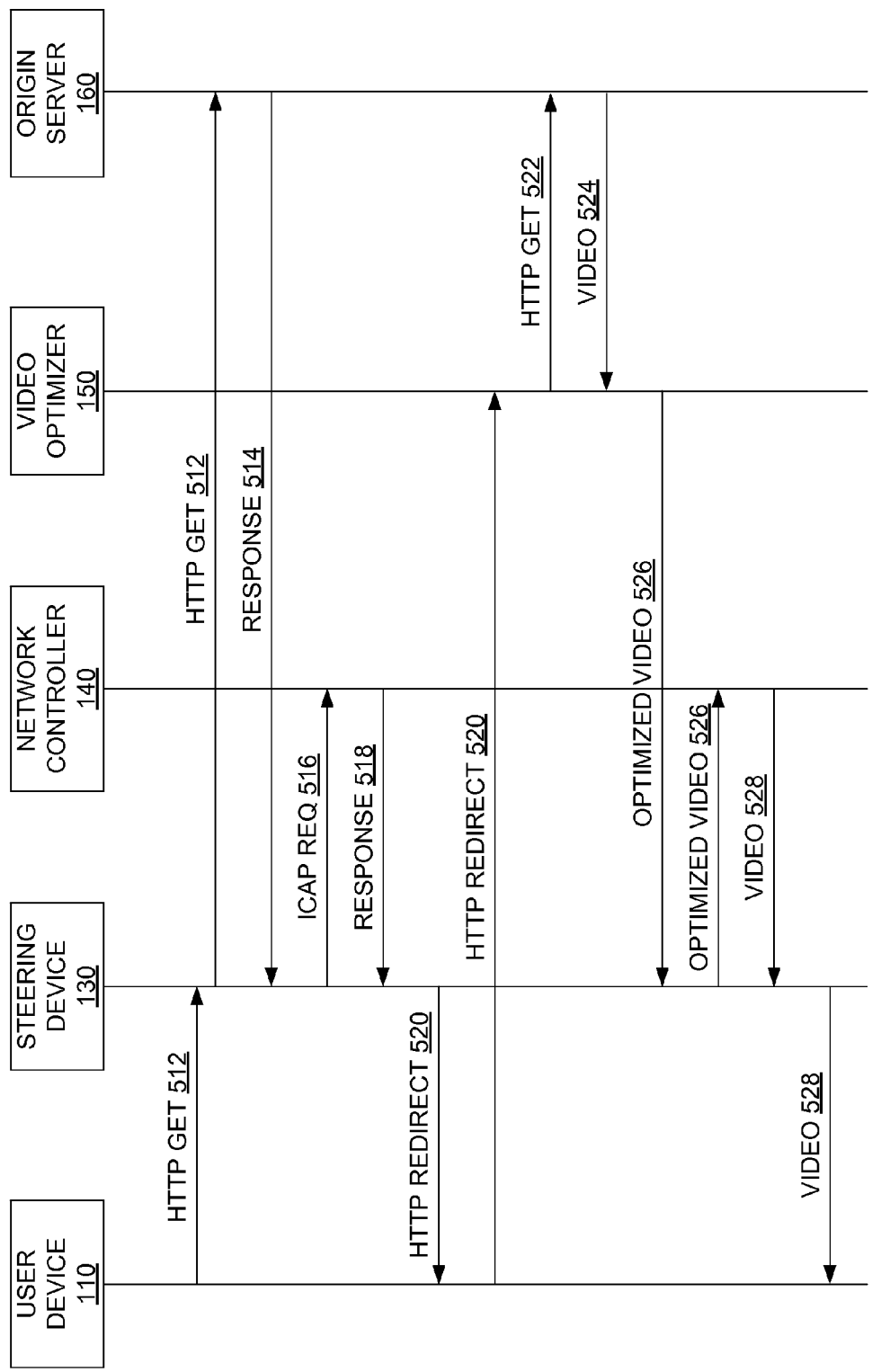
FIG. 5 illustrates one example embodiment of event trace of an example network controller in "continue" working mode for selective on-demand real-time network monitoring and subscriber identification.

FIG. 5 is a block diagram illustrating an example event trace of "continue" working mode between the user device 110, steering device 130, network controller 140, video optimizer 150, and origin server 160. The process starts when the user device 110 initiates an HTTP GET request 512 to retrieve content from the origin server 160. The steering device 130 intercepts all requests originated from the user device 110. In one embodiment, the steering device 130 forwards the HTTP get request 512 to the intended origin server 160 and receives a response 514 back from the origin server 160. The steering device 130 then sends an ICAP request message 516 comprising the HTTP GET request header and a portion of the response payload to the network controller 140, which inspects the message to determine whether to monitor the flow or optimize the video. In this case, the network controller 140 responds with a redirect to optimize the video in ICAP response 518. Upon receiving the instruction, the steering device 130 rewrites the response 514 to an HTTP redirect response 520, causing the user device 110 to request the video file from the video optimizer 150. In another embodiment, the network controller 140 sends the HTTP redirect request 520 directly to the user device 110. In case the flow dose not contain video or image objects, or the network controller 140 determines not to monitor the flow, the steering device 130 would forward the response to the user device 110.

Once the user device 110 receives the HTTP redirect request 520, the user device 110 sends the request over the network to the video optimizer 150. In one embodiment, the network controller 140 monitors the traffic and/or requests from the client device 110 as the HTTP redirect request 520 is routed to the video optimizer 150. In such a configuration, the video optimizer 150 only sees requests for video files that need to be transcoded (e.g., optimized) and are associated with a HTTP redirect request 520. As such, the video optimizer 150 is not burdened with all the requests generated by a user device 110.

After receiving the request, the video optimizer 150 forwards the video HTTP GET requests 522 to the origin server 160 and in return, receives a video file 524 from the origin server 160. The video optimizer 150 transcodes the video file to a format usable by the client device 110 based on network bandwidth available to the user device 110. The optimized video 526 is then transmitted from the video optimizer 150 to the steering device 130. In one embodiment, the steering device 130 intercepts the optimized video 526. Since the network controller 140 determines to monitor the flow in "continue" mode, the optimized video 526 is passed to the network controller 140 before it is returned to the steering device 130 and finally sent to the user device 110. As such, the client receives the optimized video 512 for substantially real-time playback on an application executing on the user device 110.

In one embodiment, responsive to an HTTP get request 522 to an origin server 160, the video optimizer receives a HTTP 404 error from the origin server 160 as opposed to a video file. In such case, the video optimizer 150 appends a "do not transcode" flag to the HTTP redirect request and returned to the user device 110, which re-sends the request out over the network to the origin server 160. The origin server 160 responds appropriately to the request by sending back video 524, which is intercepted by the steering device 130 and the inline on-demand element the network controller 140 for monitoring purpose.

Figure 6:
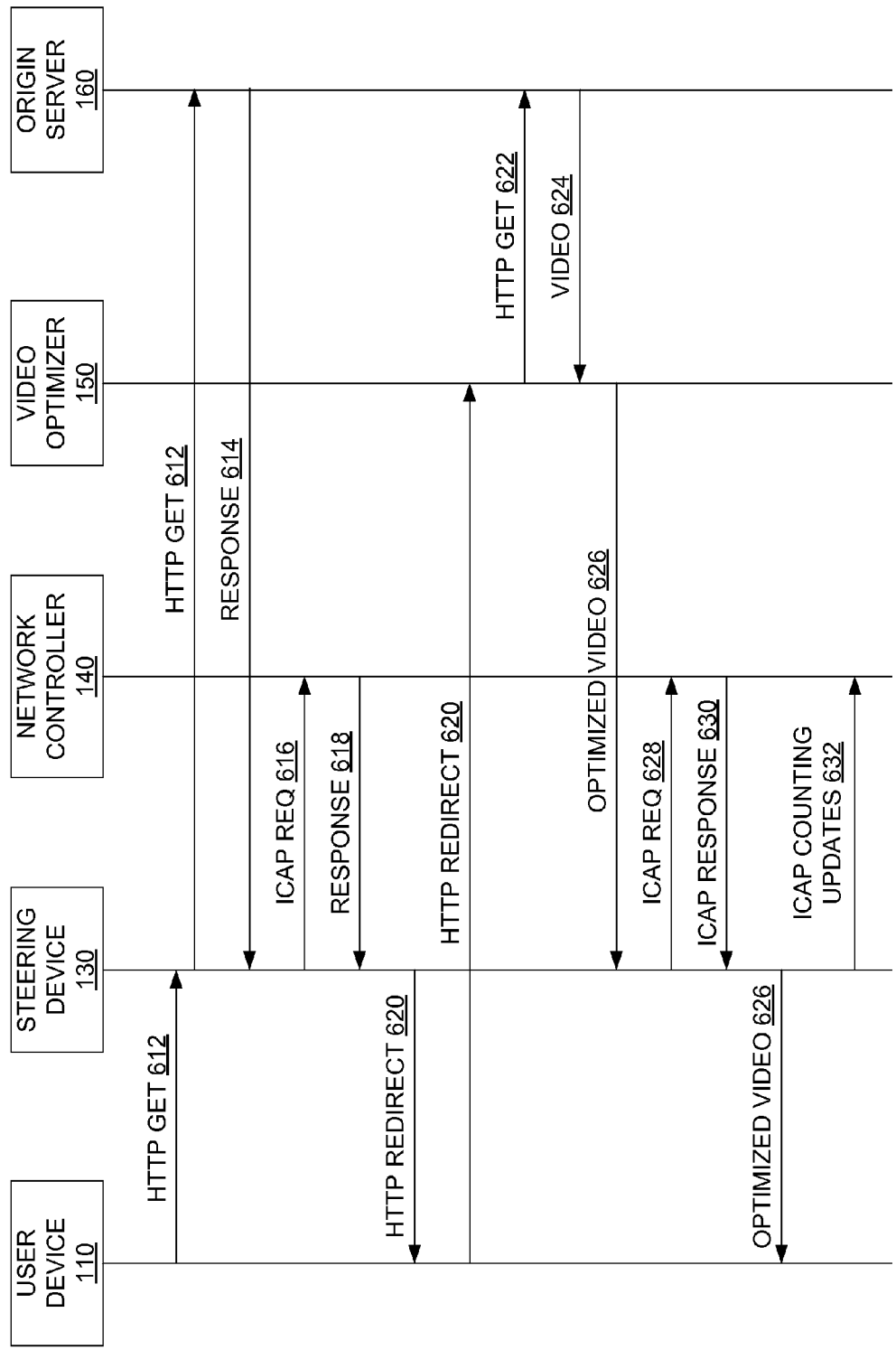
FIG. 6 illustrates one example embodiment of event trace of an example network controller in "counting" working mode for selective on-demand real-time network monitoring and subscriber identification.

FIG. 6 is a block diagram illustrating an example event trace of "counting" working mode between the user device 110, steering device 130, network controller 140, video optimizer 150, and origin server 160. The process starts when the user device 110 initiates an HTTP GET request 612 to retrieve content from the origin server 160. The steering device 130 intercepts all requests originated from the user device 110. In one embodiment, the steering device 130 forwards the HTTP get request 612 to the intended origin server 160 and receives a response 614 back from the origin server 160. The steering device 130 then sends an ICAP request message 616 comprising the HTTP GET request header and a portion of the response payload to the network controller 140, which inspects the message to determine whether to monitor the flow or optimize the video. In this case, the network controller 140 responds with a redirect to optimize the video in ICAP response 618. Upon receiving the instruction, the steering device 130 rewrites the response 614 to an HTTP redirect response 620, causing the user device 110 to request the video file from the video optimizer 150. In another embodiment, the network controller 140 sends the HTTP redirect request 620 directly to the user device 110. In case the flow dose not contain video or image objects that need to be redirected, the steering device 130 would forward the response to the user device 110.

Once the user device 110 receives the HTTP redirect request 620, the user device 110 sends the request over the network to the video optimizer 150. In one embodiment, the network controller 140 monitors the traffic and/or requests from the client device 110 as the HTTP redirect request 620 is routed to the video optimizer 150. In such a configuration, the video optimizer 150 only sees requests for video files that need to be transcoded (i.e., optimized) and are associated with a HTTP redirect request 620. As such, the video optimizer 150 is not burdened with all the requests generated by a user device 110.

After receiving the request, the video optimizer 150 forwards the video HTTP GET requests 622 to the origin server 160 and in return, receives a video file 624 from the origin server 160. The video optimizer 150 transcodes the video file to a format usable by the client device 110 based on network bandwidth available to the user device 110. The optimized video 626 is then transmitted from the video optimizer 150 to the steering device 130. In one embodiment, the steering device 130 intercepts the optimized video 626. The steering device 130 will then send an ICAP request to the network controller 140 for inspection. The network controller 140 deems this flow to be monitored and sends ICAP response 630. The steering device 130 then allows the flow to go through to the user device 110. The steering device 130 next sends periodic ICAP "counting" updates 632 to the network controller 140 until the flow completes. As such, the client receives the optimized video 626 for substantially real-time playback on an application executing on the user device 110.

In one embodiment, if the video optimizer 150 failed to retrieve user requested video file from the origin server 160, the video optimizer 150 appends a "do not transcode" flag to the HTTP redirect request and returned to the user device 110, which re-sends the request out over the network to the origin server 160. The origin server 160 responds appropriately to the request by sending back video 624, which is intercepted by the steering device 130 only. The steering device 130 forwards the video to the user device 110 and at the same time reports the flow size to the network controller 140 for monitoring purpose.

Flow Cache and User Mapping

Figure 7:
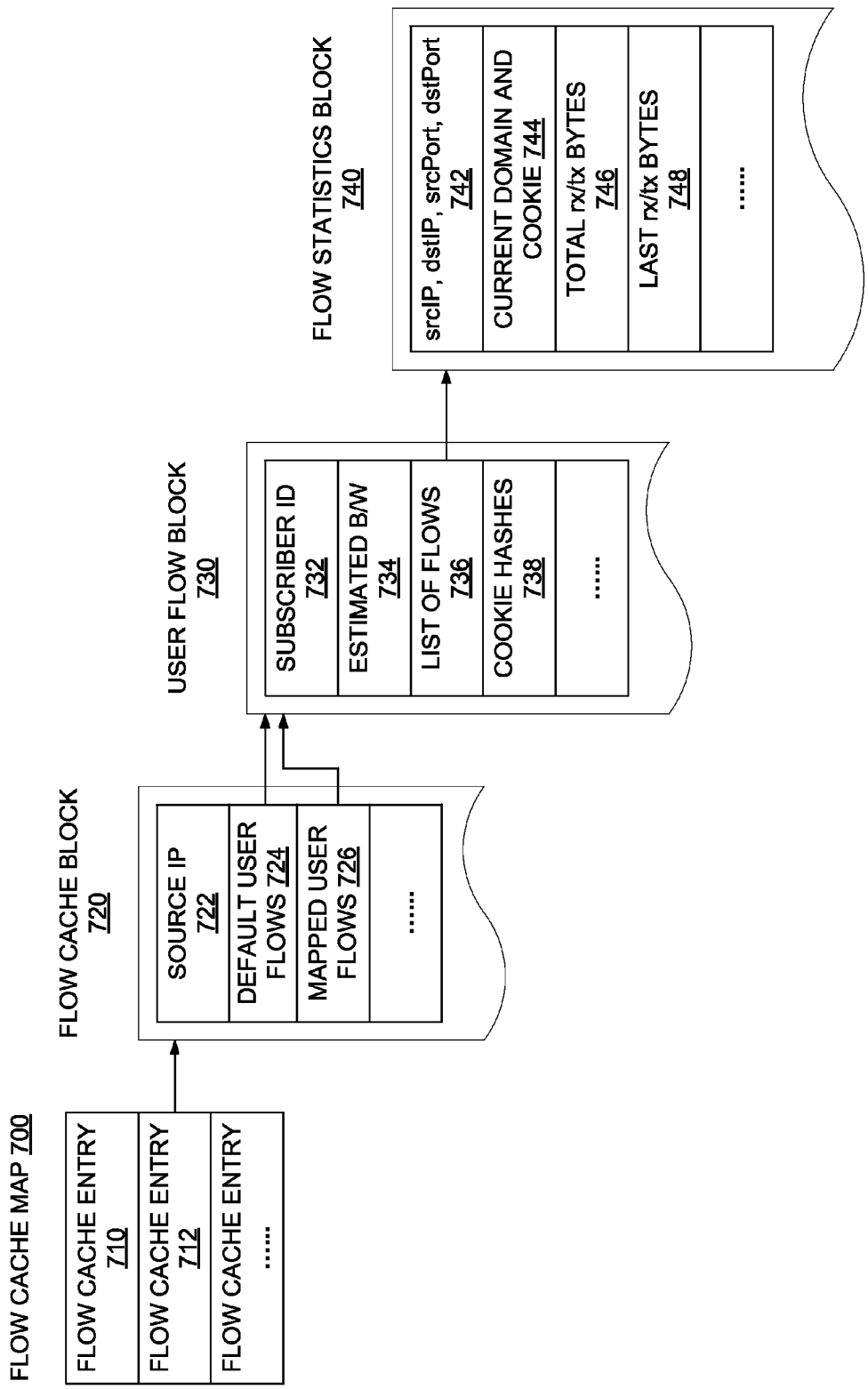
FIG. 7 illustrates one embodiment of components of an example flow cache managed by a network controller.

FIG. 7 is a block diagram illustrating one embodiment of an example of internal components of the flow cache. The flow cache map 700 comprises a plurality of flow cache entries, such as flow cache entries 710 and 712 indexed by a hash. Not shown in the example diagram is a possible linked list behind each flow cache entry which allows chaining of flow cache entries for a given hash index. The hash into the flow cache may be based on source IP address, MAC address, subscriber ID, or other identifier indicative of a given subscriber, group of subscribers or subscriber's device.

A flow cache block 720 pointed to by the flow cache entry 712 is shown to include information on source IP 722, one or more user flow blocks, which represent a logical group of flows associated with a user, a subscriber, or an entity representing a potential subscriber. Examples of these user flow blocks are default user flows block 724 and mapped user flows block 726. The default user flows block 724 store flows that are not yet associated with any particular user or subscriber. If the subscriber id or any other identifiers associated with a particular user is known a-priori, all the flows associated with the particular user or subscriber will be assigned to the mapped user flows block 726. The mapped user flows block 726 also include flows that either have been, or are in the process of being mapped to a user or subscriber by the flow analyzer 312. The mapped user flows block 726 can be indexed using subscriber id.

Ideally, a flow can be assigned to the mapped user flows block 726 for a user or subscriber by the user's source IP address. However, in some cases, flows associated with an IP address may often be associated with a group of users or subscribers, but there is not enough information to identify a particular user or subscriber. In these cases, a pseudo subscriber id can be assigned in the default user flows block 724 until real users or subscribers are identified as more flows are observed.

An example user flow block 730 that can be included in the default user flows block 724 and the mapped user flows block 726 contains data fields like the subscriber id 732 (pseudo or real) estimated bandwidth 734, a list of all flows 736 associated with the subscriber id 732, and a list of cookie hashes 738 among other related flow information. Each entry in the list of cookie hashes 738 contains one unique cookie seen within the flows. The list of flows 736 includes one or more flow statistics block 740. Each flow statistics block 740 contains the IP flow identifier 742 (e.g., srcIP, dstIP, srcPort, dstPort), current domain and cookie 744, total number of bytes seen in each direction 746, the total number of bytes in each direction as of the last update 748. Not shown in the FIG. 7 includes a list of cookie hashes associated with the flow and an expiration time.

In one embodiment, the flow cache map 700 can be split into multiple physical cache maps represented by one logical cache map. Due to large number of entries (e.g., millions of entries) and frequent accesses (e.g., thousands of times per second) to the logical caches, each split physical cache map needs to be managed and protected by its own thread against race conditions. The benefit of splitting the logical cache into multiple physical caches is to dramatically reduce the resource contention and other concurrency mishaps. The flow cache map 700 can be split in various ways, such as selecting entries for the one or more physical flow caches based on the one or more bits from the least significant bits (LSBs) of the hash index. For example, if the lowest three bits of the hash index are used as an index, all the flow entries share the same three LSBs are organized into one of eight physical flow cache maps. To search within the flow cache map, hashes of the rest of the bits are used.

The estimated bandwidth 734 in a user flow block 700 can be calculated as follows. In one embodiment, each time a user flow block 730 is created or updated in the flow cache, it is marked with a "dirty" flag. The flag serves as an indicator to the flow analyzer 312 that the bandwidth may need to be recalculated for the flow so that the flow analyzer 312 does not have to traverse every user flow block to find out if it needs updating. The "dirty" flag can be set in the user flow block 730 or in the flow statistics block 740. The recalculation or update of the bandwidth can be performed periodically (e.g., in an interval of one second, ten seconds, or a minute). When the update occurs, the difference in transmitted (and/or received) bytes since the last update is used to measure bytes over time, percentage of consumed bandwidth compared to the overall bandwidth, the receive (rx) direction or the transmit (tx) direction bandwidth during the interval. The transmitted (and/or received) bytes in the interval can also be aggregated for all the flows associated with a particular user to measure the estimated bandwidth the particular user receives.

In the bandwidth calculation, flows are categorized into buckets based on the size of the objects being transferred. Small objects may not be factored into the bandwidth calculation since they may come and go within a single interval. For example, flows with payload size less than 50 kB may be ignored because a transfer of 50 kB may never reach the full potential throughput of the link. While larger flows may reach the full throughput of the link for a long period of time intervals, they are grouped into 50-75 kB, 75-100 kB and 100 kB+ buckets because the characteristics of these flow sizes can be different, hence the bandwidth for each of the buckets is measured and calculated separately. In other embodiments, the flow size ranges (e.g., 50-75 kB, 75-100 kB and 100 kB+) of the buckets may be altered depending on the network traffic and size of objects transmitted. Furthermore, the bucket sizes can also be adjusted based on network topology, such as buffer size, prior to transmission to the client. The calculated bandwidth per bucket is stored in a queue structure that allows for the computing and updating of minimum, maximum, and/or average measurements for each bucket. In one embodiment, the 100 kB+ bucket's current tail entry is checked against the average bandwidth for the 100 kB+ bucket. If the current entry is less than the average multiplied by the number of entries in the queue, the current entry is added to the bandwidth calculation for the current interval. This scheme can filter out large bursts of data from temporarily idle flows. If the bandwidth exceeds the value, a number of bytes (e.g., 125 kB) will be subtracted from the current entry to account for TCP buffers in the network.

Once all the flows associated with a user have been allocated in the corresponding buckets, the bandwidth for each of the buckets is calculated by combining the measured data sent for all the flows in the respective bucket. In one embodiment, flow sizes in the 100 kB+ bucket is compared to a max burst value first. If a flow in the 100 kB+ bucket is larger than a certain percentage (e.g., 25%) of the max burst value, the flow is not factored into the estimated bandwidth. Specifically, when a flow has been idle for a time, a large amount of data can burst before the network backs up due to network buffers. The max burst value keeps track of the largest bandwidth value seen for 100 kB+ flows (or any highest bandwidth buckets) for a given user. If the flow size is much less than (e.g., less than 25%) the max burst value, it is added to the estimated bandwidth.

The estimated bandwidth is calculated by summing the bandwidth estimated from each of the buckets for the current interval. The estimated bandwidth is only update if there is data sent during the interval, i.e. one or more buckets are not empty. In addition, a minimum number of bytes needs to be sent in order to update the estimated bandwidth. This is done by weighting the average bandwidth per bucket multiplied by the bucket's lower byte limit (e.g. 50, 75, or 100 kB) to put more weight on data from the largest buckets. Only when the combined weight from each of the buckets exceeds a threshold value, is the estimated bandwidth updated so as to prevent small bursts of data on the smaller buckets from creating spurious bandwidth updates.

In one embodiment, the measured bandwidth is stored in a queue data structure. Each time a non-zero bandwidth is measured in an interval, the measured bandwidth is pushed into the tail of the queue. Estimated bandwidth can be calculated from an average, a maximum or a minimum value from the queue. The depth of the queue can be adjusted: more entries can smooth out variations in the estimated bandwidth, but slower to react to quick changes in the network (e.g., a small to medium size file being downloaded quickly). While fewer entries enables a faster reaction time, but reduces the ability to track longer term changes in the network (e.g., a medium to large size file being downloaded in addition to some smaller files). In one example, the queue depth may be capped between 10 and 30 entries. In another example, a sliding window technique is used in conjunction with a longer queue to smooth out variation as well as to track quick changes.

When a new flow is observed, flow cache entries are searched by matching source IP address 722 if the subscriber id or other identifiers of the flow are not available. In case of multiple users sharing an IP address, the flow analyzer 312 needs to find patterns or other identifiers in the flows to map them to particular subscribers. Flows without identified subscribers are added to the flow cache block under the default user flows 726, which is a default holding place for the new flows. The flow analyzer 312 later will scan through the default user flows that contain cookies or other identifiers that may be used to determine a real user or subscriber associated with the flow. If a flow contains identifiers not associated with an existing real user, a new user or subscriber is created and the user flow block is moved to newly created (or mapped) user or subscriber.

The flow analyzer 312 can also map flows to users (subscribers to the mobile or network service) in the flow cache entries by matching cookie hashes, MAC address (or any unique device identifiers), or TCP source ports. For example, if two flows share the same source port, it is very likely that they belong to the same user because TCP ports are reused often by an individual user, but not often between users. Furthermore, source ports can also be used to map users when network address translation (NAT) is deployed. In a typical network with NAT configuration, each user is allocated a block (e.g., 32) of TCP source ports. A random port number within the block is then picked for each new user flows initiated. With this knowledge, all source ports within a block can be aggregated under the same user. In some cases, a user with more than one block of port number assigned, the cookie hashes can be used to link the blocks together.

In some embodiments, a user flow block may be migrated from a current user to a better-matched user. This is only done in the direction from users with fewer associated flows to users with more associated flows to prevent moving flows back and forth between two users (i.e., oscillations). If all flows have been removed from a user, the user itself is removed. During the process of migrating flows, the flow properties may be combined, for example, by summing up the byte counts, combining the cookie hashes, and extending the expiration time to a later time. The subscriber log 324 stores all the mapped users. In one embodiment, existing users are organized into a database table indexed by identifiers, such as source port and cookie hash values. In one embodiment, migrating user flow block may be simply performed by unlinking the user flow block from the current user and linking it to the newly mapped user.

As in the case of table management, it is desirable to prevent the system from trying to do the user mapping across the entire flow cache in one go around. Thus, we can limit the number of user to process per pass and pick up any additional users on the next pass. As noted earlier, the identifiers may not be matched directly, but based on a hash thereof to save computation time.

Adaptive Video Encoding

Traditionally, adaptive video encoding using an optimizer relies on a client-side process, which could inform the optimizer about the network conditions. Embodiments of the invention support a clientless video optimizer. In the clientless mode, the video optimizer relies on the network controller to measure how much backpressure exists in the network so that the video optimizer can adjust the video bitrate accordingly.

In one embodiment, the video optimizer acts as an on-demand proxy that the network controller invokes with an HTTP redirect request. For instance, the network controller 140 with reference to FIG. 1 redirects the user device 110 to the video optimizer 150 to get the optimized video, which the video optimizer 150 retrieves from the origin server 160 specified in the redirect message. Once the video has been transcoded on demand by the video optimizer 150, the optimized video will be streamed to the user device. As such, the video optimizer 140 can monitor how much data it is able to push through the network.

To accomplish this, the video optimizer may include a ring buffer where video produced is stored before being sent through the network to the user device. The video optimizer keeps track of audio/video timestamps of the last data written and read from the ring buffer. If the network is backing up, data will back up in the ring buffer. By measuring the difference in timestamps of the first and last data in the ring buffer, the total latency of the network can be estimated. The video optimizer generates the audio/video stream in real-time, so nominally the ring buffer should remain empty. If the stored latency in the ring buffer exceeds a certain amount (e.g., there seconds), the video optimizer may begin reducing the encoder bitrate in the audio/video encoder. The amount of reduction of bitrate may be performed at a rate proportional to the latency. Thus, the bitrate of video in the buffer will be reduced more aggressively if the buffer continues to fill. Alternately, if the stored latency is below a certain amount (e.g., one second), the video optimizer will increase the bitrate by a fraction of the current bitrate.

Another mode of the video optimizer 150 looks for runaway bitrates. If the data rate coming out of the ring buffer is significantly less than the current encoder bit rate, the encoder bit rate can be reduced. This is useful because sometime a given audio/video sequence does not require a lot of bits to encode. The bit rate can be increased because the latency is staying low. However, the sequence may change and a lot of bits may be required, which can cause an overshoot in the encoding algorithm. In turn, the system may update the bitrates every few seconds (e.g., 5) to prevent rapid swings in video quality. The amount of the bit rate to be adjusted up and down is also regulated to prevent sudden quality changes.

In another embodiment, the video optimizer 150 is also pacing the transcoded video output, which complicates the bandwidth measurement since the average network bandwidth becomes the pacing rate rather than the real network capacity. To mitigate this problem, the video optimizer 150 can burst data output in blocks by holding output data for a number of seconds and/or a number of bytes before outputting any data to the network. Once the holding period is over and/or the number of bytes held has been reached, the video optimizer 150 transmits the data in a burst to the network at a maximum speed. This allows the video optimizer and the network controller to correctly measure the network peak capacity. The video optimizer 150 can track the average bandwidth output to the network without counting the holding periods when no data is being transmitted.

Field tests have shown that the network controller 140 plus the video optimizer 150 solution brings a break-through instant adaptation engine that can optimize nearly any video or image object in milliseconds. The engine features format coverage (e.g., Flash, MP4, and ABR video) and delivers an average of 60% data savings on video and 50% on images, together providing an average 35% reduction in total traffic for typical mobile networks. This 35% reduction is calculated during peak network usage, which drives down capital and operating expenditures as opposed to savings due to pacing/throttling of the network traffic, which does not change the capital expenditure curve. This solution is easy to deploy, maintain, and scale across a broad types of networks by blending cloud computing power and existing intelligent routing in the network.

In conclusion, embodiments of the invention provide a method and system for detecting and mitigating congestion in the mobile operator's network. To detect congestion, the system utilizes information from the network and flow-by-flow level statistics. Optimization can be triggered at bottleneck points of the network when it is needed most, i.e., when adverse network conditions, such as congestions, are detected or anticipated at times of peak load and/or based on the subscribers utilizing a particular portion of the network. The system provides broad format and protocol coverage, full transcoding support, and flexible policies (e.g., time-of-day based optimization) that maximize both optimization efficiency and quality of experience, while significantly reducing costs and serving more subscribers on the same capital equipment base. This is achieved by selectively monitoring network traffic and optimizing larger flows on-demand without introducing additional inline proxies that add unnecessary cost and scaling challenges by inherently inspecting every flow. Cloud-based optimization techniques are adopted across regions for tier 1 networks where "busy hours" may shift across time zones ensure the scalability of the solution and highly successful results. As network traffic grows exponentially over time, more congestion triggers can be turned on to handle the video explosion without large amounts of new hardware or software licenses, given the ability to achieve more and more targeted application to bottleneck points and times across the network.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors 102) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods (e.g., as described with FIGS. 4A, 4B, 5, 6, and 7) described herein may be performed, at least partially, by one or more processors (e.g., processor 102) that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory 104). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing interactive video ad with an HTML underlay through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and appa-

What is claimed is:

1. A method for selectively monitoring traffic in a service provider network, the method comprising:
receiving a notice for a beginning of a network data flow between an origin server and a user device, the data flow for delivering media content from the origin server to the user device in response to a request for the media content from the user device;
determining whether to monitor the data flow between the origin server and the user device;
collecting, responsive to a determination to monitor the data flow, statistic information corresponding to the data flow;
storing the statistic information collected for the data flow to a flow record in a database;
mapping the flow record in the database to a subscriber of the service provider network based on an analysis of the statistic information collected for the data flow;
estimating bandwidth to be consumed on the service provider network by the data flow between the user device and the origin server based on the statistic information collected for the data flow;
summing the estimated bandwidth of the data flow and estimated bandwidths of at least one other monitored data flow in the service provider network;
determining a congestion level of the service provider network based on a comparison of the sum of the estimated bandwidths against a capacity of the service provider network; and
determining whether to optimize the data flow based on the congestion level of the service provider network.

2. The method of claim 1, wherein determining whether to monitor the data flow comprises determining whether the media content in the data flow indicates transfer of video and/or images larger than a predetermined size.

3. The method of claim 1, wherein the statistical information collected for the data flow includes at least one of throughput, latency, size of the media content to be delivered, and duration of the flow.

4. The method of claim 1, wherein the flow record comprises at least one of: user device source IP address, subscriber identifier, estimated bandwidth, cookie hashes, flow identifier, and transmitted and received bytes, and wherein the flow record is updated during a lifespan of the data flow.

5. The method of claim 1, wherein estimating the bandwidth to be consumed on the service provider network by the data flow comprises:
receiving an update on transmitted or received bytes in the flow record; and
calculating the estimated bandwidth by dividing a difference between the transmitted or received bytes since a last update by an interval of time since the last update.

6. The method of claim 1, wherein determining whether to optimize the data flow based on the congestion level of the service provider network comprises determining to optimize the data flow if the congestion level of the service provider network exceeds the capacity of the service provider network.

7. The method of claim 1, wherein determining whether to optimize the data flow based on the congestion level of the service provider network comprises determining not to optimize the data flow if the congestion level of the service provider network does not exceed the capacity of the service provider network.

8. The method of claim 1, wherein the determination of whether to optimize the data flow is further based on a size of the media content to be delivered in the data flow.

9. The method of claim 1, further comprising redirecting, in response to determining to optimize the data flow, the request for the media content from the requesting user device to a video optimizer, the video optimizer retrieving the media content from the origin server, optimizing the media content for the user device, and transmitting the optimized media content to the user device.

10. The method of claim 1, wherein aggregating flow records corresponding to the subscriber in the database of the service provider network is based on matching at least one of: user device source IP address and MAC address, TCP port number, and hashes of a cookie associated with the data flows.

11. A non-transitory computer-readable storage medium storing executable computer program instructions for selectively monitoring traffic in a service provider network, the computer program instructions comprising instructions that cause a processor to:
receive a notice for a beginning of a network data flow between an origin server and a user device, the data flow for delivering media content from the origin server to the user device in response to a request for the media content from the user device;
determine whether to monitor the data flow between the origin server and the user device;
collect, in responsive to a determination to monitor the data flow, statistic information corresponding to the data flow;
store the statistic information collected for the data flow to a flow record in a database;
map the flow record in the database to a subscriber of the service provider network based on an analysis of the statistic information collected for the data flow;
estimate bandwidth to be consumed on the service provider network by the data flow between the user device and the origin server based on the statistic information collected for the data flow;
sum the estimated bandwidth of the data flow and estimated bandwidths of at least one other monitored data flow in the service provider network;
determine a congestion level of the service provider network based on a comparison of the sum of the estimated bandwidths against a capacity of the service provider network; and
determine whether to optimize the data flow based on the congestion level of the service provider network.

12. The non-transitory computer-readable storage medium of claim 11, wherein the instructions that cause the processor to determine whether to monitor the data flow comprises instructions that cause the processor to determine whether the media content in the data flow indicates transfer of video and/or images larger than a predetermined size.

13. The non-transitory computer-readable storage medium of claim 11, wherein the statistical information collected for the data flow includes at least one of throughput, latency, size of the media content to be delivered, and duration of the flow.

14. The non-transitory computer-readable storage medium of claim 11, wherein the flow record comprises at least one of: user device source IP address, subscriber identifier, estimated bandwidth, cookie hashes, flow identifier, and transmitted and received bytes, and wherein the flow record is updated during a lifespan of the data flow.

15. The non-transitory computer-readable storage medium of claim 11, wherein the instructions that cause the processor to estimate the bandwidth to be consumed on the service provider network by the data flow comprises instructions that cause the processor to:
receive an update on transmitted or received bytes in the flow record; and
calculate the estimated bandwidth by dividing a difference between the transmitted or received bytes since a last update by an interval of time since the last update.

16. The non-transitory computer-readable storage medium of claim 11, wherein the instructions that cause the processor to determine whether to optimize the data flow based on the congestion level of the service provider network comprises instructions that cause the processor to determine to optimize the data flow if the congestion level of the service provider network exceeds the capacity of the service provider network.

17. The non-transitory computer-readable storage medium of claim 11, wherein the instructions that cause the processor to determine whether to optimize the data flow based on the congestion level of the service provider network comprises instructions that cause the processor to determine not to optimize the data flow if the congestion level of the service provider network does not exceed the capacity of the service provider network.

18. The non-transitory computer-readable storage medium of claim 11, the computer program instructions further comprising instructions that cause the processor to redirect, in response to determining to optimize the data flow, the request for the media content from the requesting user device to a video optimizer, the video optimizer retrieving the media content from the origin server, optimizing the media content for the user device, and transmitting the optimized media content to the user device.

19. The non-transitory computer-readable storage medium of claim 11, wherein the instructions that cause the processor to aggregate flow records corresponding to the subscriber in the database of the service provider network comprises instructions to match to at least one of: user device source IP address and MAC address, TCP port number, and hashes of a cookie associated with the data flows.

20. A system for selectively monitoring traffic in a service provider network, comprising:
a processor; and
a non-transitory computer-readable storage medium storing executable computer program instructions that when executed by the processor:
receive a notice for a beginning of a network data flow between an origin server and a user device, the data flow for delivering media content from the origin server to the user device in response to a request for the media content from the user device;
determine whether to monitor the data flow between the origin server and the user device;
collect statistic information corresponding to the data flow in response to a determination to monitor the data flow;
store the statistic information collected for the data flow to a flow record in a database;
map the flow record in the database to a subscriber of the service provider network based on an analysis of the statistic information collected for the data flow; and
estimate bandwidth to be consumed on the server provider network by the data flow between the user device and the origin server based on the statistic information collected for the data flow;
sum the estimated bandwidth of the data flow and estimated bandwidths of at least one other monitored data flow in the service provider network;
determine a congestion level of the service provider network based on a comparison of the sum of the estimated bandwidths against a capacity of the service provider network; and
determine whether to optimize the data flow based on the congestion level of the service provider network.

21. The system of claim 20, wherein the system collects statistic information of the data flow as an inline network element that receives and forwards the data flow.

22. The system of claim 20, wherein the system receives the data flow from an inline network element in response to an initial determination to monitor the data flow based on initial statistic information collected for the data flow, the inline network element forwarding the data flow for processing in response to the initial determination to monitor the data flow.

23. The system of claim 22, wherein determining whether to monitor the data flow between the origin server and the user device further comprises, in response to a determination to not monitor the data flow, transmitting an instruction causing the inline network element to cease forwarding of the data flow through the system.

24. The system of claim 20, wherein estimating the bandwidth to be consumed on the service provider network by the data flow comprises:
receiving an update on transmitted or received bytes in the flow record; and
calculating the estimated bandwidth by dividing a difference between the transmitted or received bytes since a last update by an interval of time since the last update.

25. The system of claim 20, wherein determining whether to optimize the data flow based on the congestion level of the service provider network comprises determining to optimize the data flow if the congestion level of the service provider network exceeds the capacity of the service provider network.

26. The system of claim 20, wherein determining whether to optimize the data flow based on the congestion level of the service provider network comprises determining not to optimize the data flow if the congestion level of the service provider network does not exceed the capacity of the service provider network.

27. The system of claim 20, the computer program instructions further comprising instructions for redirecting, in response to determining to optimize the data flow, the request for the media content from the requesting user device to a video optimizer, the video optimizer retrieving the media content from the origin server, optimizing the media content for the user device, and transmitting the optimized media content to the user device.

* * * * *